United States Patent Office 3,644,549
Patented Feb. 22, 1972

3,644,549
DEHYDROGENATION OF ETHYLBENZENE TO STYRENE USING SO₂ AND FERRITE CATALYSTS IN THE FORM OF SPINELS OR PEROVSKITES
Robert A. Innes, Wilkins Township, Allegheny County, and Raymond J. Rennard, Jr., O'Hara Township, Allegheny County, Pa., assignors to Gulf Research & Development Company, Pittsburgh, Pa.
No Drawing. Filed Sept. 9, 1970, Ser. No. 70,904
Int. Cl. C07c *15/10*
U.S. Cl. 260—669
15 Claims

ABSTRACT OF THE DISCLOSURE

Styrene is produced by the dehydrogenation of ethylbenzene using $SO_2$ and certain ferrite catalysts. The ferrite catalysts in the form of spinels can have the formula: $A_aA'_bFe_cO_4$ where A can be Co, Ni, Zn or Mg (preferably Zn or Mg) and A' can be Cr or La. The sum of $a+b+c$ is 3 and only $b$ can be zero. The ferrite catalysts in the form of perovskites can have the formula: $B_dCr_eFe_fO_3$ where B can be La or Y (preferably La) and $d+e+f=2$ and each individually can be 0.5 to 1.5. These ferrites give very high yields of styrene and are unusually stable to continuous $SO_2$ dehydrogenation-oxidative regeneration cycles.

This invention relates to the dehydrogenation of ethylbenzene to styrene. More particularly, this invention relates to the dehydrogenation of ethylbenzene to styrene using $SO_2$ and selected ferrite catalysts.

Present commercial processes for producing styrene involve the high temperature catalytic dehydrogenation of ethylbenzene which is an endothermic and equilibrium controlled reaction. Oxidative dehydrogenation processes have been proposed in the art (see U.S. Pats. 3,450,787–9) using zinc, magnesium and lanthanum chromium ferrites plus a gas containing free molecular oxygen. The latter patented processes were found to be quite suitable for the dehydrogenation of an aliphatic olefin such as butene-1 or butene-2 to butadiene and all of the examples in the patents relate to this process. When attempts were made to oxidatively dehydrogenate ethylbenzene to styrene using the ferrite catalysts, the yields of styrene were less than desired and considerable cracking occurred as the temperatures were increased.

A process has now been discovered for the dehydrogenation of ethylbenzene to styrene in unexpectedly high yields utilizing a catalyst which is unexpectedly stable when subjected to rapid and repeated regeneration of the catalyst by oxidative burnoff.

In accordance with the invention, ethylbenzene is dehydrogenated to styrene by contacting the ethylbenzene together with $SO_2$ under dehydrogenation conditions with a catalyst comprising a ferrite of the spinel form having the formula:

$$A_aA'_bFe_cO_4$$

where:

A is a metal selected from the group consisting of cobalt, nickel, zinc, and magnesium;
A' is a metal selected from chromium and lanthanum;
$a$ has a value of from 0.1 to about 3;
$b$ has a value from 0 to less than 2;
$c$ has a value from greater than 0 to about 3; and
$a+b+c$ has a value of 3; or a ferrite of the perovskite form having the formula:

$$B_dCr_eFe_fO_3$$

where:

B has a valence of plus 3 and is selected from lanthanum and yttrium;
$d$, $e$ and $f$ are each values from 0.5 to 1.5 and the sum of $d$, $e$ and $f$ is 2.

It is one of the surprising features of this invention that the defined ferrites are unusually stable and can be regenerated repeatedly and in short cycles by oxidative burnoff with substantial restorations of the original catalytic activity. Such feature is surprising since other iron based catalysts were found to be either less active than the defined ferrites, or regenerated poorly or both. While it is not certain how, it is believed the presence of the zinc, magnesium, or other defined metals to the iron to form the spinel or perovskite structure stabilizers the iron to repeated $SO_2$ dehydrogenation-oxidative regeneration cycles while simultaneously rendering the iron catalyst unusually effective for producing high yields of styrene from ethylbenzene.

The catalysts which are useful in the process of this invention are certain ferrites in the form of spinels and certain ferrites in the form of perovskites. By "spinel" in the application is meant a normal, inverse or random spinel. The ferrites in the form of spinels which are useful in the process of this invention have the formula:

$$A_aA'_bFe_cO_4$$

where:

A has a valence of plus 2 and is a metal selected from the group consisting of cobalt, nickel, zinc, and magnesium;
A' is a metal having a valence of plus 3 and is selected from the group consisting of chromium and lanthanum;
$a$ has a value of from 0.1 to about 3;
$b$ has a value from 0 to less than 2;
$c$ has a value from greater than 0 to about 3; and
$a+b+c$ has a value of 3.

In one preferred form, the ferrite spinels have the formula:

$$AA'_xFe_yO_4$$

where:

A has a valence of plus 2 and is a metal selected from the group consisting of cobalt, nickel, zinc, and magnesium;
A' is a metal having a valence of plus 3 and is selected from the group consisting of chromium and lanthanum; and
$x$ is a value from 0 to 1.5; $y$ is a value from 0.5 to 2 and $x$ plus 6 has a value equal to 2.

It is more preferred in the above ferrite spinels that A be selected from zinc and magnesium; A' be chromium; $x$ have a value from 0 to 1; $y$ have a value from 1 to 2; and $x$ plus $y$ have avalue of 2.

Examples of suitable ferrite spinels include but are not limited to:

$ZnFe_2O_4$
$MgFe_2O_4$
$MgCrFeO_4$
$ZnCrFeO_4$
$CoFe_2O_4$
$CoCrFeO_4$
$CoLaFeO_4$
$NiCrFeO_4$
$NiFe_2O_4$
$MgLaFeO_4$

The ferrites in the form of peroskites which are useful in the process of this invention have the formula:

$$B_dCr_eFe_fO_3$$

where:

B has a valence of plus 3 and is selected from lanthanum yttrium; and $d$, $e$ and $f$ each has a value from 0.5 to 1.5 and the sum of $d$, $e$, and $f$ is 2.

It is preferred in the above perovskite that B is lanthanum.

Examples of suitable perovskites include but are not limited to:

$LaCr_{0.5}Fe_{0.5}O_3$
$YCr_{0.5}Fe_{0.5}O_3$
$La_{0.5}Cr_{0.5}FeO_3$
$La_{0.25}Cr_{0.25}Fe_{1.5}O_3$

The ferrite spinels and perovskites useful in the process of this invention can suitably be prepared by methods well known in the art and their method of preparation forms no part of this invention. For example, ferrites can be made by the coprecipitation of aqueous salts of the desired metals, especially the nitrate salts of the desired metals. U.S. Pats. 3,450,787; 3,450,788 and 3,450,789 disclose suitable methods of preparing the ferrites disclosed therein and such methods are also suitable for preparing the ferrites useful in the process of this invention. The ferrites may also be prepared by the fusion of the dry nitrate salts or oxides or by other procedures. Usually the catalysts have a surface area less thn 10 m.²/gm., preferbly less than 2 m.²/gm. Surface area can be lowered by increasing the calcining temperature of the catalyst.

The catalyst can be employed in the form of a stationary bed positioned in a suitable reaction zone providing for intimate contact among the ethylbenzene, sulfur dioxide and catalyst. Suitable reaction zones can comprise one or more chambers of enlarged cross-sectional area, reaction zones of restricted cross-sectional areas, such as, for example, tubular reactor, or combinations thereof.

The ethylbenzene is dehydrogenated by contact with at least one of the above defined ferrites in the presence of $SO_2$. The $SO_2$ can be employed as such and obtained from any suitable source or the $SO_2$ can be produced in situ by the reaction of suitable compounds such as $H_2S$ and oxygen.

The dehydrogenation is preferably carried out in the presence of an amount of sulfur dioxide expressed as a sulfur dioxide/ethylbenzene molar ratio of at least 0.5. In a preferred method of carrying out the invention, the sulfur dioxide/ethylbenzene molar ratio is maintained in the range of from about 0.5 to about 2.0. Sulfur dioxide/ethylbenzene molar ratios of from about 0.5 to about 10.0 can be employed within the scope of this invention.

The dehydrogenation is effected in the vapor state at a temperature in the range of from about 300° to about 700° C. and preferably in the range of from about 500° to about 700° C., more preferably from about 550° to about 650° C. The reactants can be preheated prior to introduction with the reaction zone, or a part of the reactants can be injected into the reaction zone at one or more points along its length.

The pressure employed is generally not critical. Thus, the process can be executed at subatmospheric, atmospheric or superatmospheric pressures. In general, it is preferred to maintain a pressure sufficietly high to facilitate circulation of materials through the system. A desirable pressure range is, for exmple, from about 0 to about 25 p.s.i.g.

The space velocity employed can vary considerably within the scope of the invention. A liquid hourly space velocity of ethylbenzene of from about 0.1 to about 10 is convenient. A preferred liquid hourly space velocity is from about 0.2 to about 2.0, and a more preferred range is from about 0.25 to about 0.75.

The reaction time of the time the ethylbenzene is present in the reaction zone can suitably be from one to 60 seconds. Usually the reaction time is from 2 to 20 seconds.

In practicing this process, it is preferred that a gas in addition to ethylbenzene and sulfur dioxide be present in the reactor to serve as a diluent to reduce the partial pressure of the ethylbenzene, thereby diminishing the quantity of carbonaceous compounds deposited on the surface of the catalyst during dehydrogenation. Gases which can be employed include steam, air and the generally inert gases such as nitrogen, helium, argon, etc. Although the steam was effectively employed as a diluent in the dehydrogenation system, it does not appear to possess the additional feature of removing the carbonaceous compounds deposited on the catalyst, which feature steam does possess when it is employed as a diluent for commercial ethylbenzene dehydrogenation processes. The molar ratio of diluent to ethylbenzene is suitably from 1:1 to 20:1 or more.

Since the build-up of carbonaceous compounds upon the catalyst surface is not readily curtailed by standard methods, periodic regeneration of the ferrite catalyst is required. The oxidative regeneration of either an iron oxide or commercially available iron oxide based catalyst which had been deactivated by use in the $SO_2$ dehydrogenation of ethylbenzene was not successful in that the ethylbenzene conversion using the "regenerated" catalysts was about the same as the deactivated catalyst at the end of its run. This nonregenerability of the catalysts appears to be due at least in part to the physical deterioration of the catalyst during dehydrogenation. When the ferrites of this invention are employed for the $SO_2$ dehydrogenation of ethylbenzene, they remain stable and are readily regenerated to conversion levels of ethylbenzene substantially equaling those levels attained by fresh catalyst.

The invention will be further defined with reference to the following experimental work.

In all of the experimental work, the ethylbenzene, $SO_2$ and diluent gas were admixed in a heated transfer line and the mixture passed downflow through a bed of desired catalyst held in a quartz reactor. All runs were made at atmospheric pressure.

In a first series of experiments, a $ZnCrFeO_4$ catalyst was employed which was prepared by the method set forth in Example 1 of U.S. Pat. 3,450,788, column 6, lines 14-44, except the catalyst was calcined at 900° C. for 16 hours.

EXAMPLE 1

In the run for this example, a mixture of steam and ethylbenzene in a molar ratio of 10:1 was passed downflow over the $ZnCrFeO_4$ catalyst described above at a temperature of 600° C. and a liquid hourly space velocity based on the ethylbenzene of 0.3. The weight percent conversion of ethylbenzene was 18 and the yield of styrene was 16.0 percent. The results are summarized in Table I below.

EXAMPLE 2

Example 1 was repeated except air was also added in a 1:1 molar ratio with the ethylbenzene. The conversion of ethylbenzene increased to 25 but the yield only to 19.6 percent. The results are summarized in Table I below.

EXAMPLE 3

Example 2 was repeated except the molar ratio of air to ethylbenzene was increased to 5:1. The conversion increased to 37 percent, but the yield of styrene only to 22.6 percent. The results are summarized in Table I below.

EXAMPLE 4

Example 2 was repeated except $SO_2$ replaced the air. The conversion of ethylbenzene increased to 96.1 percent and the yield increased to 82.5 percent. The results are summarized in Table I below.

TABLE I.—DEHYDROGENATION OF ETHYLBENZENE TO STYRENE USING A ZnCrFeO₄ CATALYST

[Conditions: atmospheric pressure; 600° C. and a LHSV based on the ethylbenzene of 0.3]

| Ex. No. | Mole ratio, steam:ethyl benzene: air:SO₂ | Weight. percent conversion | Percent selectivities [1] | | | | | | Percent yield [2] of styrene |
|---|---|---|---|---|---|---|---|---|---|
| | | | Styrene | Benzene | Toluene | CO₂ | Thianaphthene | Other | |
| 1 | 10:1:0:0 | 18 | 89.1 | 5.1 | 2.0 | | | 3.8 | 16.0 |
| 2 | 10:1:1:0 | 25 | 78.3 | 7.1 | 2.4 | 10.0 | | 2.2 | 19.6 |
| 3 | 10:1:5:0 | 37 | 62.1 | 3.2 | 1.3 | 29.3 | | 4.1 | 23.0 |
| 4 | 10:1:0:1 | 96.1 | 86.0 | 0.5 | 0.5 | | 11.1 | 1.9 | 82.6 |

[1] Selectivity was calculated by mole percent based on ethylbenzene converted.
[2] Yield was calculated by multiplying conversion times selectivity.

Referring to Table I above, it can be seen that there is over a fivefold increase in yield of styrene by the addition of SO₂ to the ethylbenzene reaction zone (Example 1 compared with Example 4). The use of SO₂ gave much higher conversions, selectivities and yields of styrene than the same molar amount of air (Examples 2 and 4) or oxygen (Examples 3 and 4). The thianaphthene by-product in Example 4 has been mentioned as an intermediate for the drug and dye industries by Paul B. Venuto in the Preprints of General Papers presented before Division of Petroleum Chemistry, American Chemical Society, 13, March 7, 1968.

A series of runs were made with different ferrites and other iron-based catalysts. For each of the runs a feed consisting of $N_2$, $SO_2$ and ethylbenzene in a molar ratio of 4:1:1 was passed downflow over the catalyst at 600° C., atmospheric pressure, and an ethylbenzene LHSV of 0.5. Each catalyst was run for 16 hours, regenerated at 600° C. with air at a gas hourly space velocity of 1000, then run again until maximum activity was determined. The results of this series of runs are shown in Table II below.

TABLE II

| Ex. No. | Catalyst, formula | Surface area, m.²/g. | Percent conversion | | | |
|---|---|---|---|---|---|---|
| | | | 0-2 hours | Maximum | 14-16 hours | Maximum after regeneration |
| 5 | ZnCrFeO₄ | 1.8 | 94 | 96 | 60 | 95 |
| 6 | MgCrFeO₄ | 6.3 | 96 | 96 | 38 | 96 |
| 7 | Same | 3.0 | 94 | 94 | 44 | 94 |
| 8 | ZnNiFeO₄ | <0.1 | 70 | 83 | 67 | 81 |
| 9 | LaCr₁/₂Fe₁/₂O₃ | 0.9 | 91 | 91 | 48 | 93 |
| 10 | MgFe₂O₄ | 1.7 | 88 | 89 | 83 | 89 |
| 11 | ZnFe₂O₄ | 2.3 | 93 | 93 | 59 | 92 |
| 12 | Fe₂O₃ with small amounts of Cr₂O₃ and K₂O. | 1.3 | 95 | 96 | 60 | 65 |
| 13 | Fe₂O₃ | 0.8 | 70 | 70 | 59 | 58 |

Note.—Conditions-Reaction: LHSV=0.5, Temp.=600° C., N₂/EB/SO₂=4/1/1; Regeneration: GHSV air=1000, Temp.=1140 to 1,220° F., Time=3 hours.

Referring to Table II, it can be seen that various ferrites in the form of spinels were active (Examples 5–8 and 10–11) as well as a ferrite in the form of a perovskite (Example 9). The zinc and magnesium chromium spinels were prepared by the methods of U.S. Pats. 3,450,788 and 3,450,787, respectively. The catalyst of Example 13 was made by (1) making a solution of 171 grams of Fe(NO₃)₃·9H₂O in one liter of water; (2) making a solution of 25 percent NH₄OH in 600 ml. water; (3) adding the above two solutions to 100 grams of NH₃HCO₃ in one liter of water in such a way to maintain the pH at 8.5. The resulting precipitate was filtered and oven dried at 250° F. The dried precipitate was calcined overnight at an initial temperature of 350° C., which temperature was increased at a rate of 4° F./minute until a temperature of 650° C. was reached. The sample was calcined a second time of 900° C. for 16 hours.

During the course of the runs for Examples 12 and 13, the catalysts physically deteriorated. Treatment with air at the end of 16 hours failed to restore the activity.

A cyclic process was operated using a ZnCrFeO₄ catalyst. Each cycle consisted of the following steps:

(1) The catalyst was pretreated with N₂ and SO₂ at gas hourly space velocities of 540 and 54, respectively, for 5 minutes. The temperature of the catalyst bed was 600° C.;

(2) Ethylbenzene was then added to the gas stream at a liquid hourly space velocity of 0.3, i.e., a gas hourly space velocity (GHSV) of 54.

(3) After the ethylbenzene had been on-stream for 2 hours, the SO₂ and ethylbenzene flows were stopped and the reactor was purged with N₂ for 5 minutes.

(4) The catalyst was then burned off with air at a gas hourly space velocity of 1000 for 10 minutes and the cycle repeated.

Over a period of twelve cycles there was no change from cycle to cycle in either conversion or selectivity. The complete product analysis is given in Table III below. When the burnoff time was reduced to 5 minutes, conversion fell from 94 percent to 89 percent after 12 cycles.

TABLE II

Products of ethylbenzene dehydrogenation using SO₂

| | |
|---|---|
| Catalyst | ZnCrFeO₄ |
| N₂/EV/SO₂ molar ratios | 10/1/1 |
| LHSV of ethylbenzene | 0.3 |
| Temperature, ° C. | 600 |
| Time (hrs.) | [1] 24 |
| Wt. percent ethylbenzene conversion | 94 |
| Selectivities (mole percent): | |
|   Styrene | 87 |
|   Thianaphthene | 9.1 |
|   Benzene | 0.3 |
|   Toluene | 0.5 |
|   CS₂ | 2.2 |
|   COS | 0.2 |
|   CO₂ | 0.2 |
|   Coke | 1.1 |
|   Total | 100.6 |

[1] In 2 hrs. cycles.

Resort may be had to such variations and modifications as fall within the spirit of the invention and the scope of the appended claims.

We claim:

1. A process for the dehydrogenation of ethylbenzene to styrene comprising:
contacting ethylbenzene and SO₂ in the vapor phase under dehydrogenation conditions with a catalyst comprising:
a ferrite of the spinel form having the formula $$A_aA'_bFe_cO_4$$

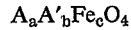

where A has a valence of plus 2 and is a metal selected from the group consisting of cobalt, nickel, zinc and magnesium; A' has a valence of plus 3 and is selected from the group consisting of chromium and lanthanum; $a$ has a value from 0.1 to about 3; $b$ has a value from 0 to less than 2; $c$ has a value from greater than 0 to about 3; and $a+b+c$ has a value of 3; or a ferrite of the perovskite form having the formula $$B_dCr_eFe_fO_3$$

where B has a valence of plus 3 and is selected from lanthanum and yttrium; $d$, $e$ and $f$ are each values from 0.5 to 1.5 and the sum of $d$, $e$ and $f$ is two.

2. A process according to claim 1 wherein the catalyst is a ferrite of the perovskite form having the formula $$B_dCr_eFe_fO_3$$

where B has a valence of plus 3 and is selected from lanthanum and yttrium; $d$, $e$ and $f$ are each values from 0.5 to 1.5 and the sum of $d$, $e$ and $f$ is two.

3. A process according to claim 2 wherein B is lanthanum.

4. A process according to claim 1 wherein the catalyst is a ferrite of the spinel form having the formula $$A_aA'_bFe_cO_4$$

where A is a metal selected from the group consisting of cobalt, ncikel, zinc and magnesium; A' is a metal selected from chromium and lanthanum; $a$ has a value from 0.1 to about 3; $b$ has a value from 0 to less than 2; $c$ has a value from greater than 0 to about 3; and $a+b+c$ has a value of 3.

5. A process according to claim 4 wherein the catalyst has the formula $$AA'_xFe_yO_4$$

where A has a valence of plus 2 and is a metal selected from the group consisting of cobalt, nickel, zinc, and magnesium; A' is a metal having a valence of plus 3 and is selected from the group consisting of chromium and lanthanum; and $x$ is a value from 0 to 1.5; $y$ is a value from 0.5 to 2 and $x$ plus $y$ has a value equal to 2.

6. A process according to claim 5 wherein A is selected from zinc and magnesium; A' is chromium; $x$ has a value from 0 to 1; $y$ has a value from 1 to 2, and the sum of the values of $x$ and $y$ is 2.

7. A process according to claim 6 wherein the catalyst is $ZnCrFeO_4$.

8. A process according to claim 6 wherein the catalyst is $MgCrFeO_4$.

9. A process according to claim 4 wherein the dehydrogenation conditions include a temperature from 300° to 700° C.

10. A process according to claim 1 wherein a diluent gas is also present.

11. A process according to claim 10 wherein the molar ratio of diluent to ethylbenzene is from 1 to 20; the $SO_2$ to ethylbenzene ratio is from 0.5 to 10.0; and the liquid hourly space velocity of the ethylbenzene is from 0.1 to 10.

12. A cyclic process for the dehydrogenation of ethylbenzene to produce styrene which comprises:
(1) contacting ethylbenzene with $SO_2$ in the vapor phase under dehydrogenation conditions with a catalyst comprising:
a ferrite of the spinel form having the formula $$A_aA'_bFe_cO_4$$

where A has a valence of plus 2 and is a metal selected from the group consisting of cobalt, nickel, zinc and magnesium; A' is a metal having a valence of plus 3 and is selected from the group consisting of chromium and lanthanum; $a$ has a value from 0.1 to about 3; $b$ has a value from 0 to less than 2; $c$ has a value from greater than 0 to about 3; and $a+b+c$ has a value of 3; or a ferrite of the perovskite form having the formula $$B_dCr_eFe_fO_3$$

where B has a valence of plus 3 and is selected from lanthanum and yttrium; $d$, $e$ and $f$ are each values from 0.5 to 1.5 and the sum of $d$, $e$ and $f$ is 2;

(2) regenerating said ferrite catalyst with a gas containing free molecular oxygen;
(3) contacting ethylbenzene and $SO_2$ in the vapor phase under dehydrogenation conditions with said regenerated ferrite catalyst to obtain substantially the same yields of styrene as were obtained initially.

13. A process according to claim 12 wherein the dehydrogenation conditions include a temperature from 300° to 700° C., a liquid hourly space velocity of ethylbenzene from 0.2 to 2.0, and a reaction time of 1 to 60 seconds.

14. A process according to claim 13 wherein the surface area of the catalyst is less than 10 m.²/gram.

15. A process according to claim 14 wherein a diluent gas is also present.

References Cited
UNITED STATES PATENTS

| | | | |
|---|---|---|---|
| 3,291,756 | 12/1966 | Bowman | 260—669 |
| 3,403,192 | 9/1968 | Vadekar et al. | 260—669 |
| 3,513,216 | 5/1970 | Woskow | 260—669 |

CURTIS R. DAVIS, Primary Examiner